(12) United States Patent
Ozawa et al.

(10) Patent No.: US 9,067,513 B2
(45) Date of Patent: Jun. 30, 2015

(54) SEAT SLIDE POSITION DETECTION DEVICE FOR VEHICLE

(75) Inventors: Motohiko Ozawa, Kanagawa (JP);
Timothy J. Wieber, Plymouth, MI (US);
Paul J. Jefferies, Plymouth, MI (US);
Harutomi Nishide, Saitama (JP)

(73) Assignees: Johnson Controls Technology Company, Holland, MI (US); Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 13/542,565

(22) Filed: Jul. 5, 2012

(65) Prior Publication Data

US 2014/0008510 A1  Jan. 9, 2014

(51) Int. Cl.
*F16M 13/00* (2006.01)
*B60N 2/06* (2006.01)
*B60N 2/07* (2006.01)
*B60N 2/02* (2006.01)

(52) U.S. Cl.
CPC .............. *B60N 2/067* (2013.01); *B60N 2/0705* (2013.01); *B60N 2/0715* (2013.01); *B60N 2002/0272* (2013.01)

(58) Field of Classification Search
CPC ..... B60N 2/002; B60N 2/0224; B60N 2/0881
USPC ................................ 248/424, 429; 296/65.13
See application file for complete search history.

(56) References Cited

U.S. PATENT DOCUMENTS

| | | | | |
|---|---|---|---|---|
| 4,909,560 A | * | 3/1990 | Ginn | 296/65.15 |
| 6,683,544 B2 | * | 1/2004 | Tokunaga et al. | 341/15 |
| 6,774,625 B2 | * | 8/2004 | Suzuki et al. | 324/207.24 |
| 7,147,261 B2 | * | 12/2006 | Ventura et al. | 296/65.13 |
| 7,511,479 B2 | * | 3/2009 | Schuler et al. | 324/207.2 |
| 7,564,234 B2 | * | 7/2009 | Endoh et al. | 324/207.24 |
| 8,049,491 B2 | * | 11/2011 | Nishide | 324/207.24 |
| 2002/0125396 A1 | * | 9/2002 | Kume et al. | 248/429 |
| 2004/0251723 A1 | * | 12/2004 | Endo et al. | 297/284.1 |
| 2012/0018608 A1 | * | 1/2012 | Nishide et al. | 248/429 |

FOREIGN PATENT DOCUMENTS

JP  2008-201299 A  9/2008
JP  2012-025221 A  2/2012

OTHER PUBLICATIONS

Office Action dated Jun. 27, 2014 in corresponding Japanese Application No. 2013-130340.

* cited by examiner

*Primary Examiner* — Amy Sterling
(74) *Attorney, Agent, or Firm* — Foley & Lardner LLP

(57) ABSTRACT

A seat slide position detection device for a vehicle includes: a fixed rail attached to a vehicle floor; a movable rail supported to the fixed rail slidably in a longitudinal direction of the fixed rail; a detected portion disposed in a predetermined area of the fixed rail extending in the longitudinal direction; and a position sensor attached to the movable rail and having a sensor detector in a position of the position sensor opposed to the detected portion. The position sensor includes a protrusion attached to the movable rail with an extremity portion of the protrusion in contact with the movable rail.

10 Claims, 6 Drawing Sheets

FR ←→ RR

SEAT SLIDE POSITION DETECTION DEVICE FOR VEHICLE

BACKGROUND OF THE INVENTION

1. Field of the Invention

The invention relates to a seat slide position detection device for a vehicle.

2. Description of the Related Art

In some of related seat slide position detection devices for a vehicle, for example, a detected portion is provided on a vertical wall portion on one of the left and right sides of a fixed rail such as a lower rail, the vertical wall portion vertically extending upward along a lateral wall portion on the one side of the fixed rail; and a position sensor is disposed in a position on the one side of a movable rail such as an upper rail and on the other side of the left and right sides viewed from the vertical wall portion, the position being higher than a sensor detection surface to be sensed by the position sensor (see Japanese Patent Application Publication No. 2012-025221).

SUMMARY OF THE INVENTION

In such related art, however, the vertical wall portion on which the detected portion is provided and a plate on which the position sensor is provided are supported in a cantilever manner by the fixed rail and the movable rail, respectively. For this reason, the vertical wall portion and the plate are likely to deform due to vibrations caused by the run of the vehicle, and the accuracy of detecting the seat slide position is likely to deteriorate.

An object of the present invention is to provide a seat slide position detection device for a vehicle which stabilizes the accuracy of detecting the seat slide position despite the vibrations caused by the run of the vehicle.

An aspect of the present invention is a seat slide position detection device for a vehicle (for example, a seat slide position detection device for a vehicle 1 in an embodiment), including: a fixed rail (for example, a lower rail 3 in an embodiment) attached to a vehicle floor (for example, a floor panel 2 in the embodiment); a movable rail (for example, an upper rail 4 in the embodiment) supported to the fixed rail slidably in a longitudinal direction of the fixed rail; a detected portion (for example, a detected portion 5 in the embodiment) disposed in a predetermined area of the fixed rail extending in the longitudinal direction; and a position sensor (for example, a position sensor 7 in the embodiment) attached to the movable rail and having a sensor detector (for example, a sensor detector 6 in the embodiment) in a position of the position sensor opposed to the detected portion, wherein the position sensor includes a protrusion (for example, a first protrusion 8 in the embodiment) attached to the movable rail with an extremity portion (for example, an extremity portion 8a in the embodiment) of the protrusion in contact with the movable rail.

According to the aspect of the present invention, the position sensor is attached to the movable rail, and has the sensor detector in the position opposed to the detected portion. In addition, the position senor includes the protrusion attached with the extremity portion in contact with the movable rail. For this reason, the accuracy of detecting the seat slide position is stabilized despite the vibrations caused by the run of the vehicle.

The position sensor may have one end portion fixedly held by the movable rail by means of a support portion (for example, a bolt 18 in the embodiment) and an other end portion (for example, a positioning section 12 in the embodiment) locked by a seat cushion frame (for example, a seat cushion frame 16 in the embodiment) to form a positioning section (for example, a positioning section 12 in the embodiment).

According to the foregoing configuration, the position sensor has one end portion fixedly held by the movable rail by means of the support portion and an other end portion locked by the seat cushion frame to the movable rail to form the positioning section. For this reason, the position sensor is easily positioned by the positioning section locked by the seat cushion frame.

The detected portion may be disposed on a top surface of an engagement portion of the fixed rail (for example, an engagement portion 3a of the lower rail 3 in the embodiment).

According to the foregoing configuration, the detected portion is disposed on the top surface of the engagement portion of the fixed rail. For this reason, the placement of the detected portion on the engagement portion of the fixed rail formed to be long with high precision in terms of the front-rear relationship remarkably increases the accuracy of detecting the movable rail.

The protrusion may be in line contact with a side surface of the movable rail.

According to the foregoing configuration, the protrusions are in line contact with the side surface of the movable rail. For this reason, the position accuracy of the contact of the protrusions increases further.

DETAILED DESCRIPTION OF THE EMBODIMENT

Figure 1:
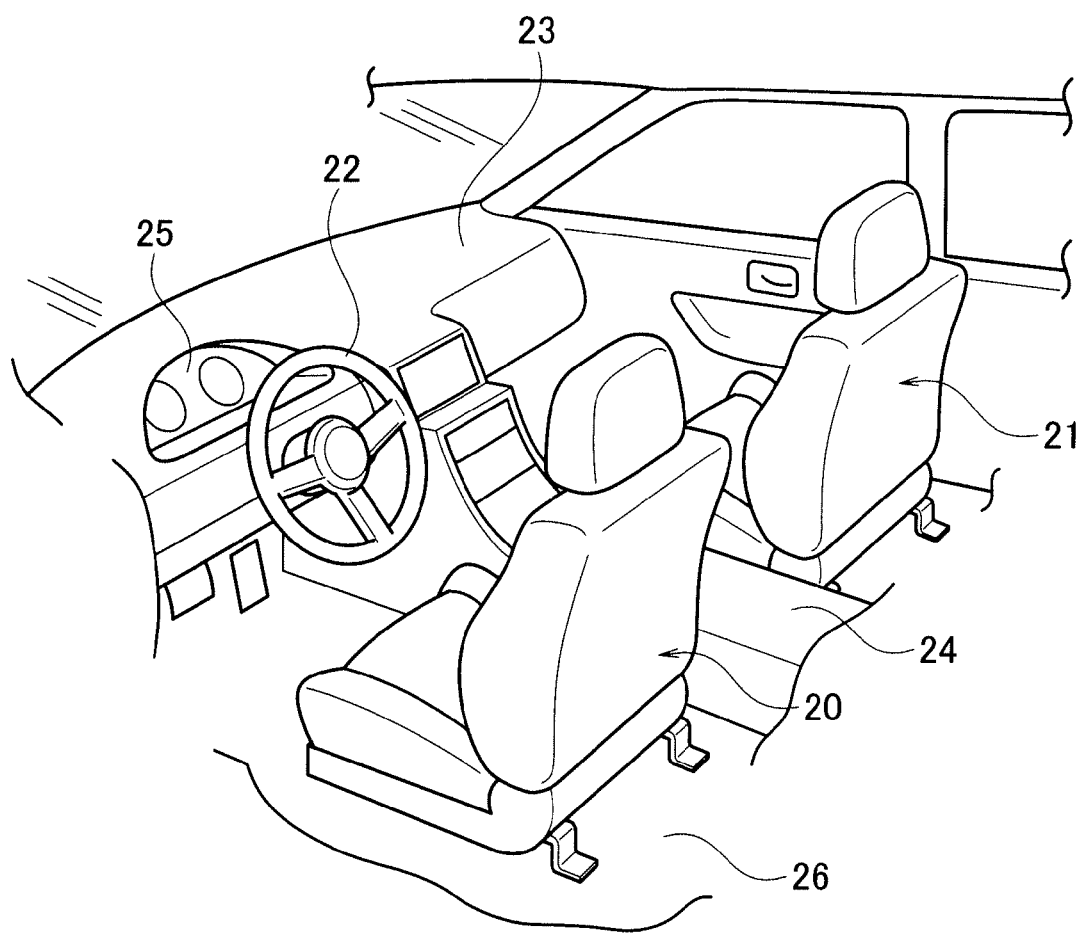
FIG. 1 is a perspective explanatory view diagonally showing vehicle seats and their vicinity of an embodiment of the present invention from the rear.
Figure 2:
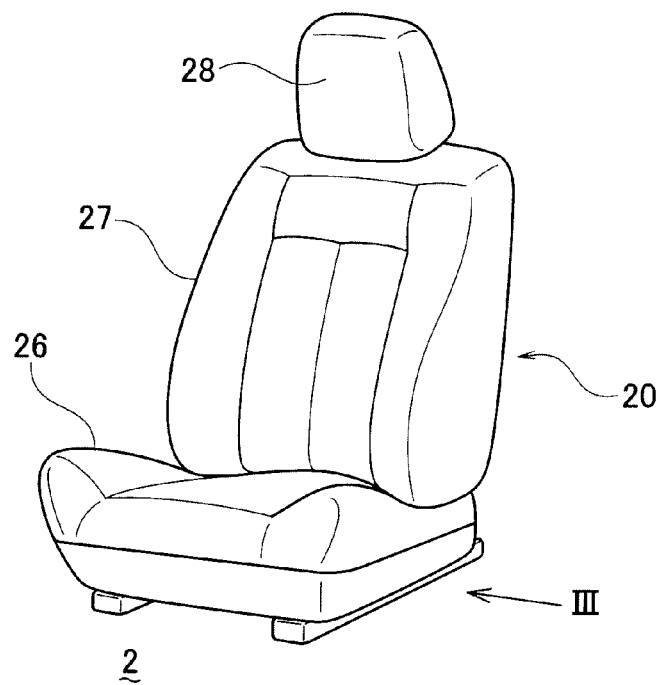
FIG. 2 is a perspective explanatory view diagonally showing one of the seats of FIG. 1 from the front.
Figure 3:
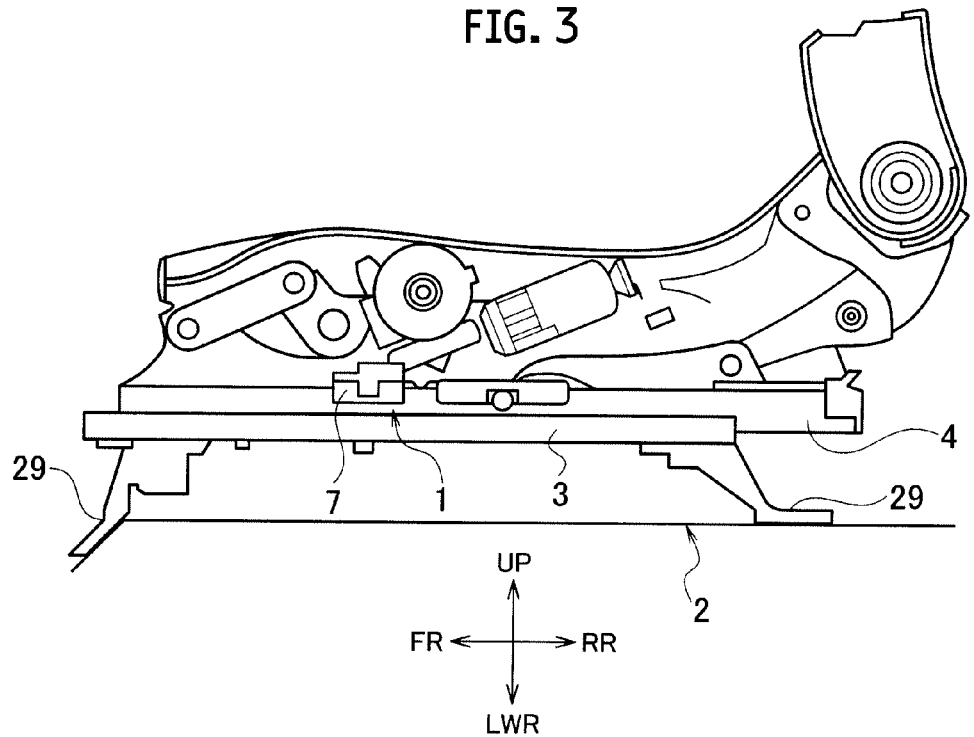
FIG. 3 is a side view showing a seat slide device and a seat slide position detection device for a vehicle which are viewed in the direction of an arrow III of FIG. 2.
Figure 4:
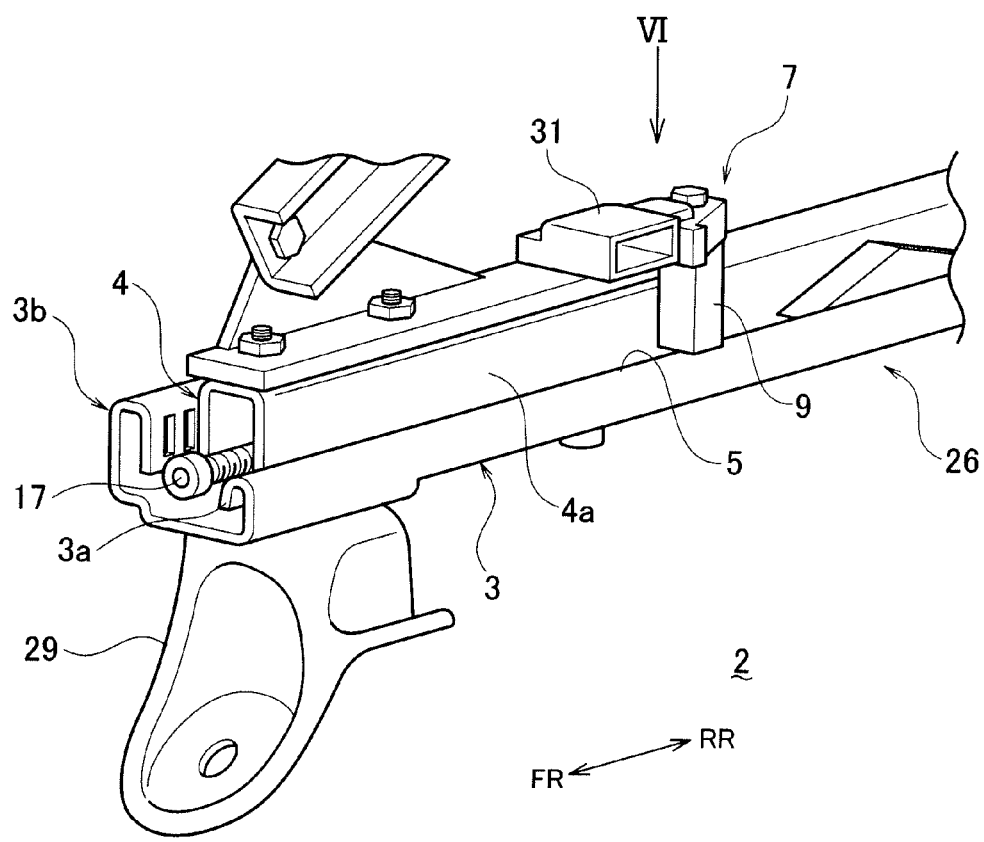
FIG. 4 is a perspective view showing the seat slide position detection device for a vehicle of FIG. 3.
Figure 5:
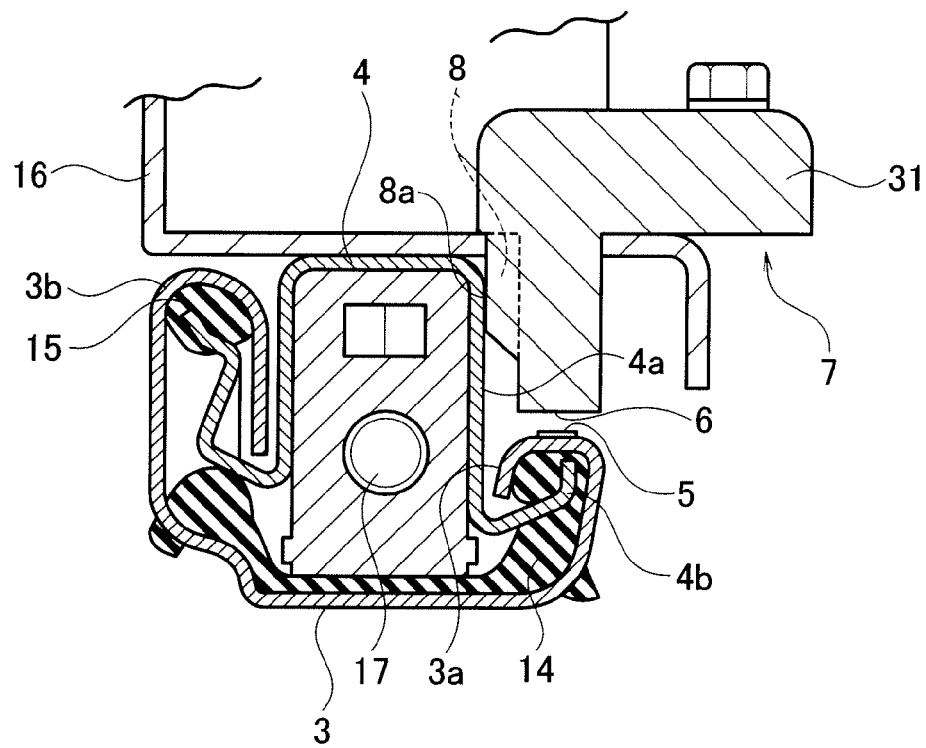
FIG. 5 is a cross-sectional view of the seat slide position detection device for a vehicle taken along the line V-V of FIG. 4.

An object of providing a seat slide position detection device for a vehicle capable of stabilizing the accuracy of detecting the seat slide position despite vibrations caused by the run of the vehicle is attained by using the following configuration. Specifically, the seat slide position detection device for a vehicle includes: a fixed rail attached to a vehicle floor; a movable rail supported to the fixed rail slidably in a longitudinal direction of the fixed rail; a detected portion disposed in a predetermined area extending in the longitudinal direction of the fixed rail; and a position sensor attached to the movable rail and having a sensor detector in a position of the position sensor opposed to the detected portion, the position sensor including a protrusion attached with an extremity portion of the protrusion in contact with the movable rail.

Descriptions will be provided for an embodiment of the present invention on the basis of FIG. 1 to FIG. 10. Reference sign 20 shown in FIG. 1 denotes a driver's seat; 21, a front passenger seat; 22, a steering wheel; 23, an instrument panel; and 24, a console box. The driver's seat 20 includes at least a seat cushion 26, a seat back 27, and a head rest 28.

The seat cushion 26 includes at least: a lower rail 3 as the "fixed rail" which is attached to a floor panel 2 as the "vehicle floor" with the assistance of brackets 29; an upper rail 4 as the "movable rail" which is supported by the lower rail 3 and being slidable toward a front side FR and a rear side RR in the longitudinal direction of the lower rail 3; a drive unit 17 configured to slide the upper rail 4 toward the front side FR and the rear side RR; a seat slide position detection device for a vehicle 1 configured to detect where the upper rail 4 is situated on the lower rail 3 in the front-rear direction, particularly whether or not the upper rail 4 is situated in a position closest to the front side FR, and to display a result of the detection on an indicator 25. Incidentally, the meaning of an expression saying "includes at least" used in the preceding paragraph and this paragraph suggests that there may be a case where not only these components but also a reclining device, a seat elevation device, a walk-in device or the like are incorporated.

The seat slide position detection device for a vehicle 1 includes: a detected portion 5 disposed on the top of an engagement portion 3a of the lower rail 3, and in a predetermined area extending in the longitudinal direction of the lower rail 3; a position sensor 7 attached with extremity portions 8a of first protrusions 8 as the "protrusions" being in line contact with side surface 4a of the upper rail 4, and having a sensor detector 6 disposed in a position opposed to the detected portion 5. As shown in 10, a total of four second protrusions 13 protruding from the front and rear surfaces of the sensor detector 6 are housed in a notch 16b of a seat cushion frame 16 while extending along the two sides of the notch 16b.

The first protrusions 8, 8, whose cross sections are each shaped like a triangle, are projectingly formed, in parallel at an interval of a predetermined dimension, on a side surface 9a of a square block 9 including the sensor detector 6 of the position sensor 7. The attachment is made with the extremity portions 8a of the first protrusions 8, 8 being in line contact with the side surface 4a of the upper rail 4.

Figure 7:
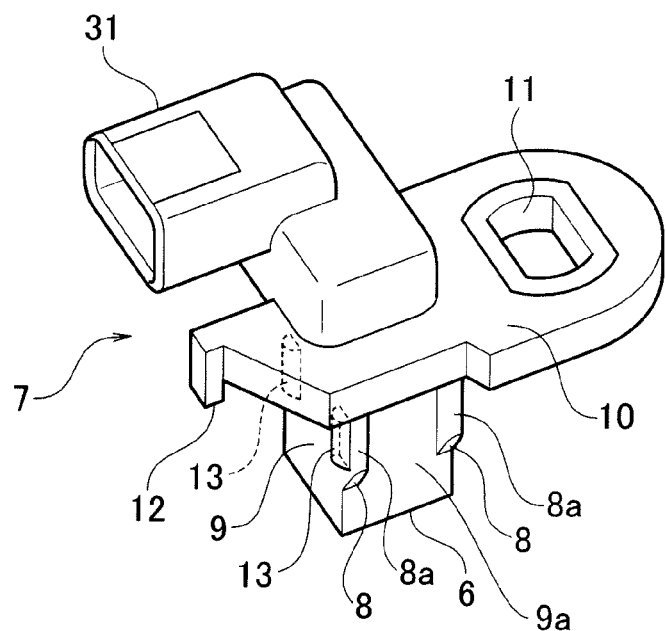
FIG. 7 is a perspective view diagonally showing the seat slide position detection device for a vehicle of FIG. 6 from the above.

The position sensor 7 includes: the square block 9 having the sensor detector 6; a support section 10 extending horizontally toward both the front side FR and the rear side RR of the block 9; an attachment section 11 formed in an end portion of the support section 10 which is closer to the front side FR, and penetrating the end portion from an upper side UP to a lower side LWR; and a positioning section 12 formed in an end portion of the support section 10 which is closer to the rear side RR, and protruding toward the lower side LWR, as shown in FIG. 7. The position sensor 7 is made of synthetic resin.

Figure 6:
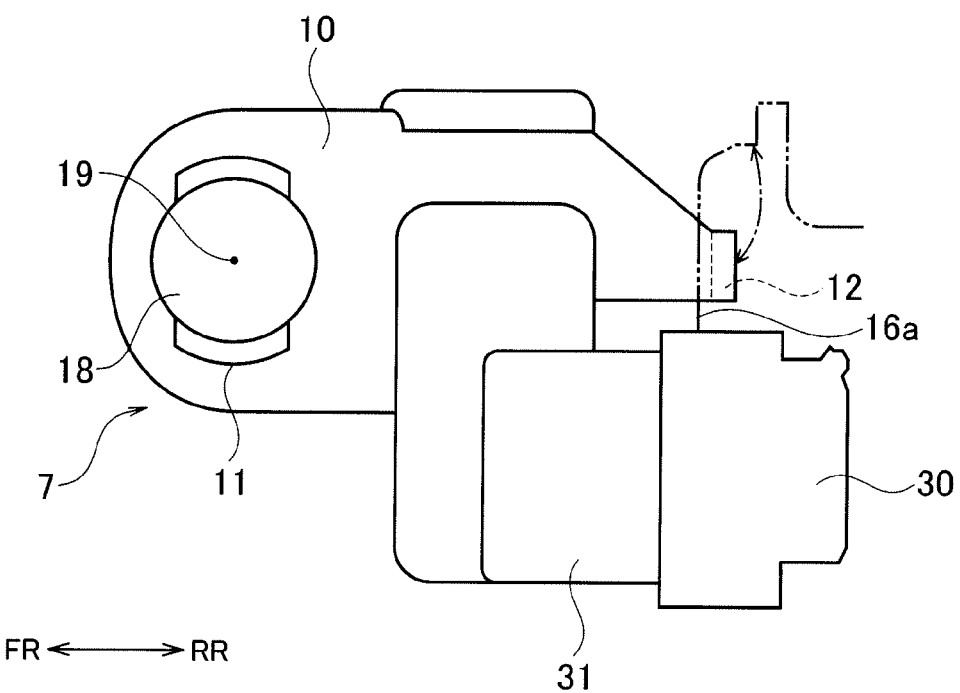
FIG. 6 is a top view of the seat slide position detection device for a vehicle which is viewed in the direction of an arrow VI of FIG. 4.
Figure 8:
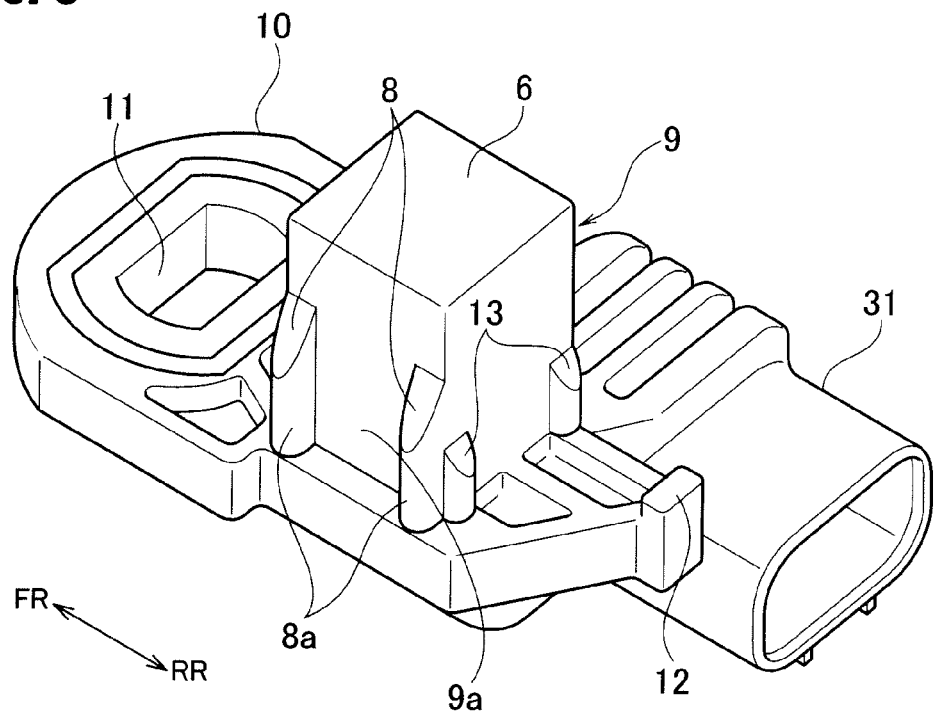
FIG. 8 is a perspective view showing the seat slide position detection device of FIG. 7 upside down.
Figure 9:
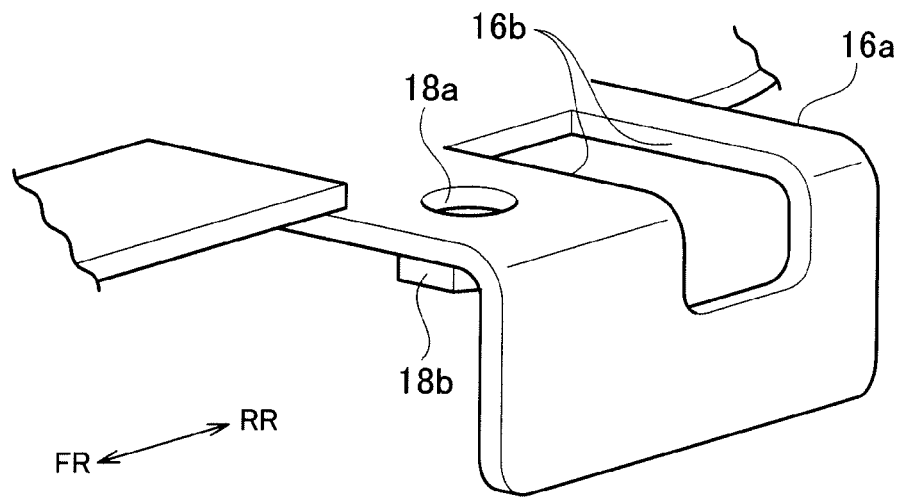
FIG. 9 is a perspective view of a state of the seat slide position detection device for a vehicle of FIG. 5 from which a position sensor is removed.
Figure 10:
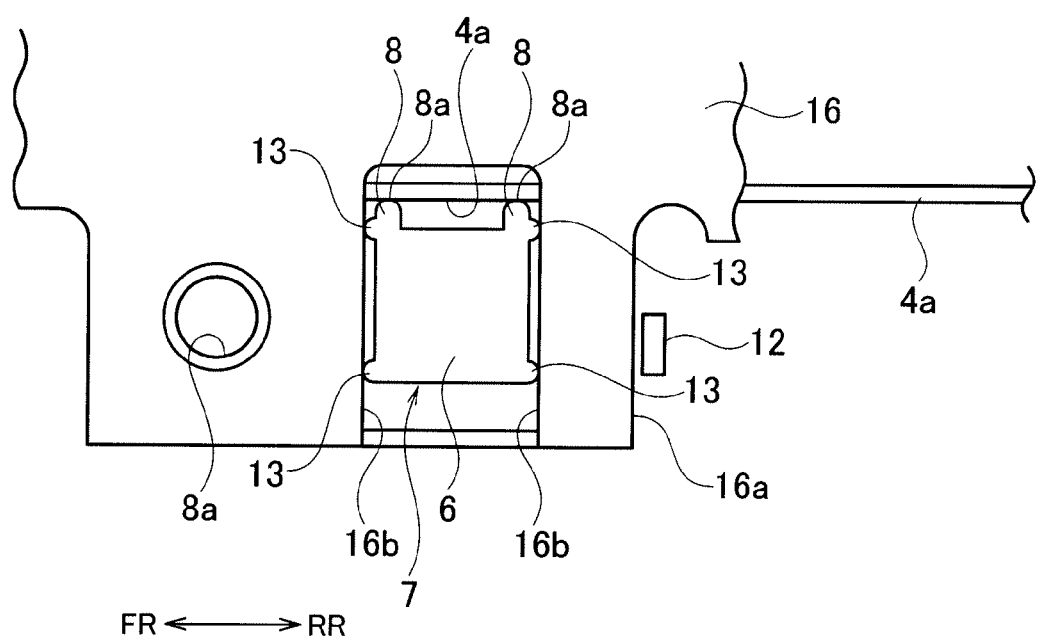
FIG. 10 is a plan view showing a relationship between a seat cushion frame and a position sensor of FIG. 5.

As shown in FIG. 7 and FIG. 8, the attachment section 11 is shaped like a long hole which is long toward a left side LH and a right side RH, as well as short toward the front side FR and the rear side RR. As shown in FIG. 6, the positioning section 12 is shaped like a square. A connection portion 31 is engaged with a connector 30, and transmits a detected condition, which is detected by the sensor detector 6, to the indicator 25 installed in the vehicle as an electrical signal.

The position sensor 7 is supported by: making the extremity portions 8a of the first protrusions 8 in line contact with the side surface 4a of the upper rail 4; and screwing a bolt 18 (a support member), which is inserted in the attachment section 11, to a nut 18b through the upper rail 4 and a lower hole 18a of the seat cushion frame 16. In this process, as shown in FIG. 6, the position of the positioning section 12 is appropriately adjusted relative to an end edge 16a by using a rotation center 19 of the bolt 18 as a reference. The extremity portions 8a of the first protrusions 8 are supported by being in line contact with the side surface 4a of the upper rail 4.

Next, descriptions will be provided for how the embodiment works.

The position sensor 7 includes the sensor detector 6: which is housed with the second protrusions 13 extending along the two sides of the notch 16b of the seat cushion frame 16; which is attached with the first protrusions 8 in line contact with the side surface 4a of the movable rail 4; and which is disposed in the position opposed to the detected portion 5. For this reason, the accuracy of detecting the slide position of the upper rail 4 is stabilized despite vibrations caused by the run of the vehicle.

In addition, the positioning section 12, which is lockable by being inserted in the end edge 16a formed in the seat cushion frame 16 supported by the top portion of the upper rail 4, is formed in the other end portion of the position sensor 7. For this reason, the positioning section 12 of the position sensor 7 is locked by the end edge 16a, and thereby, the position sensor 7 is easily positioned.

Furthermore, the detected portion 5 is arranged on the top surface of the engagement portion 3a of the lower rail 3. For this reason, the placement of the detected portion 5 in the engagement portion 3a of the lower rail 3, which is formed to be long with high precision in terms of the front-rear relationship, remarkably increases the accuracy of detecting the position of the upper rail 4.

Moreover, the first protrusions 8 are formed to be capable of being in line contact with the side surface 4a of the upper rail 4. For this reason, the shapes of the first protrusions 8 are formed stably, and the position accuracy accordingly increases further.

The foregoing embodiment has been described by using the seat of a one-box type automobile as an example of the vehicle seat. However, the embodiment is not limited to this example. The embodiment is applicable to seats installed in airplanes, railroad cars, ships/boats and the like.

The foregoing descriptions have been provided for the embodiment of the present invention. However, the invention is not limited to the above-described embodiment, and can be modified variously.

REFERENCE SIGNS LIST 1 seat slide position detection device for a vehicle
2 floor panel as "vehicle floor"
3 lower rail as "fixed rail"
3a engagement portion
4 upper rail as "movable rail"
4a side surface
5 detected portion
6 sensor detector
7 position sensor
8 first protrusion as "protrusion"
8a extremity portion
9 block 10 support section

What is claimed is:

1. A seat slide position detection device for a vehicle, comprising:
  a fixed rail attached to a vehicle floor;
  a movable rail supported to the fixed rail slidably in a longitudinal direction of the fixed rail;
  a detected portion disposed in a predetermined area of the fixed rail extending in the longitudinal direction;
  a seat cushion frame fixedly held by the movable rail; and
  a position sensor attached to the movable rail via the seat cushion frame and having a sensor detector in a position of the position sensor opposed to the detected portion, wherein the position sensor comprises a protrusion with an extremity portion in contact with the movable rail,
  wherein the position sensor has an extended portion,
  wherein the extended portion extends in a vertical direction towards the fixed rail, and
  wherein the protrusion is provided on the extended portion and protrudes toward the movable rail in a lateral direction.

2. The seat slide position detection device for vehicle according to claim 1, wherein the position sensor has one end portion fixedly held by the movable rail via the seat cushion frame and an other end portion locked by the seat cushion frame to form a positioning section.

3. The seat slide position detection device for vehicle according to claim 1,
  wherein the detected portion is disposed on a top surface of an engagement portion of the fixed rail,
  wherein the top surface is substantially opposite a bottom surface of the engagement portion, and
  wherein the bottom surface engages with the movable rail.

4. The seat slide position detection device for vehicle according to claim 1, wherein the protrusion is in line contact with a side surface of the movable rail.

5. The seat slide position detection device for vehicle according to claim 1,
  wherein the detected portion is disposed on a top surface of an engagement portion of the fixed rail with the movable rail,
  wherein the top surface is substantially opposite a bottom surface of the engagement portion,
  wherein the bottom surface engages with the movable rail,
  wherein the sensor detector is provided on a lower end of the extended portion,
  wherein the lower end is substantially opposite to an upper end of the extended portion,
  wherein the upper end is attached to the movable rail, and
  wherein the detected portion and the sensor detector face each other in the vertical direction.

6. A seat slide position detection device for vehicle, comprising:
  a fixed rail attached to a vehicle floor;
  a movable rail supported to the fixed rail slidably in a longitudinal direction of the fixed rail;
  a detected portion disposed in a predetermined area of the fixed rail extending in the longitudinal direction;
  a seat cushion frame fixedly held by the movable rail; and
  a position sensor attached to the movable rail via the seat cushion frame and having a sensor detector in a position of the position sensor opposed to the detected portion, wherein the position sensor comprises a protrusion with an extremity portion in contact with the movable rail,
  wherein the position sensor has one end portion fixedly held by the movable rail via the seat cushion frame and an other end portion locked by the seat cushion frame to form a positioning section,
  wherein the one end portion of the position sensor is fixedly held by the movable rail via the seat cushion frame with a bolt, and
  wherein a position of the positioning section is adjusted relative to an end edge of the seat cushion frame by using a rotation center of the bolt as a reference.

7. The seat slide position detection device for vehicle according to claim 1, wherein the lateral direction is 90° from the longitudinal direction.

8. The seat slide position detection device for vehicle according to claim 1, wherein the vertical direction is 90° from the lateral direction and the longitudinal direction.

9. The seat slide position detection device for vehicle according to claim 6,
  wherein the detected portion is disposed on a top surface of an engagement portion of the fixed rail,
  wherein the top surface is substantially opposite a bottom surface of the engagement portion, and
  wherein the bottom surface engages with the movable rail.

10. The seat slide position detection device for vehicle according to claim 6, wherein the protrusion is in line contact with a side surface of the movable rail.

* * * * *